S. POOLE
Nut-Cracker and Pick.

No. 198,678. Patented Dec. 25, 1877.

Witnesses.
Chas. H. Smith
Geo. T. Pinckney

Inventor
Samuel Poole.
per Lemuel W. Serrell
atty.

UNITED STATES PATENT OFFICE.

SAMUEL POOLE, OF BROOKLYN, NEW YORK.

IMPROVEMENT IN NUT CRACKER AND PICK.

Specification forming part of Letters Patent No. 198,678, dated December 25, 1877; application filed November 22, 1877.

*To all whom it may concern:*

Be it known that I, SAMUEL POOLE, of Brooklyn, in the county of Kings and State of New York, have invented an Improvement in Nut Cracker and Pick, of which the following is a specification:

Lever nut-crackers have been made in which there are jaws, between which the nuts are placed.

My improvement relates to a nut-cracker similar in its general shape to a pair of pinchers; but the jaws are peculiarly made, so as to be adapted to the nuts, and there is a nut-pick at the end of one of the jaws, that can be used for removing the nut from the shell, and the end of the other jaw is made sufficiently thin to act with the picker as a pair of forceps for withdrawing the meat from the shell.

Figure 1:
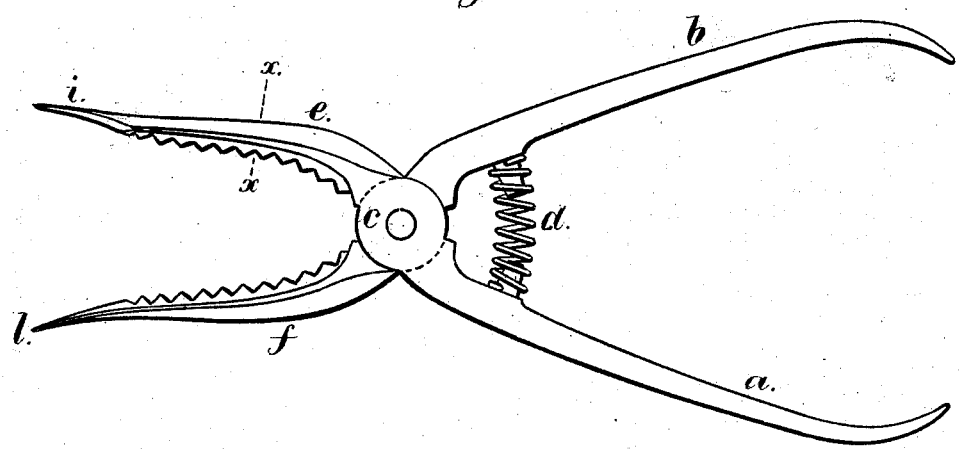
Figure 2:
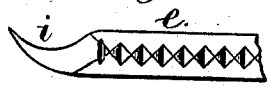
Figure 3:

In the drawings, Figure 1 is a side view. Fig. 2 shows the inner surface of one of the jaws, and Fig. 3 is a cross-section at the line $x$ $x$.

The handles $a$ $b$ are pivoted together at $c$, and $d$ is a spring to open them. The jaws $e f$ are curved outwardly, so that the broader space between them, when closed, is near the pivot or joint $c$, so as to have the necessary leverage for large nuts.

The interior faces of the jaws $e f$ are made with teeth. There is a single row of teeth along the center of each jaw, the surfaces of the jaws inclining each way, so that the teeth are pointed. This produces teeth that are adapted to penetrate the nut-shell, and not to slip on the same, and hence the pressure will be exerted to advantage in splitting and cracking the nut-shell.

The end of the jaw $e$ is reduced in thickness, and formed with a hooked point, $i$, that is adapted to use as a nut-pick; and the end of the jaw $f$ is also reduced in thickness, and may be used as a scoop or pick, $l$, and the two parts $i$ $l$ form together forceps, by which the meat can be grasped and pulled out of the shell of the nut, thus combining the cracker, the pick, and the extractor in one implement.

I claim as my invention—

1. The nut-cracker formed with the lever-handles, curved jaws $e$ and $f$, a row of pointed teeth inside each jaw, substantially as set forth.

2. The combination, with the nut-cracker, of a nut-pick, formed at the end of one of the jaws, substantially as set forth.

3. In a nut-cracker, a pair of toothed jaws, the ends of which are reduced in thickness to form forceps, substantially as set forth.

Signed by me this 20th day of November, A. D. 1877.

SAMUEL POOLE.

Witnesses:
 GEO. T. PINCKNEY,
 CHAS. H. SMITH.